United States Patent
Murai et al.

(10) Patent No.: US 9,468,924 B2
(45) Date of Patent: Oct. 18, 2016

(54) DISPERSION COMPOSITION OF FLUORINE-CONTAINING ION EXCHANGE RESIN

(71) Applicant: Asahi Kasei E-materials Corporation, Tokyo (JP)

(72) Inventors: Takahiko Murai, Tokyo (JP); Kohei Kita, Tokyo (JP); Naoki Sakamoto, Tokyo (JP)

(73) Assignee: Asahi Kasei E-materials Corporation, Tokyo (JP)

(*) Notice: Subject to any disclaimer, the term of this patent is extended or adjusted under 35 U.S.C. 154(b) by 859 days.

(21) Appl. No.: 13/713,565

(22) Filed: Dec. 13, 2012

(65) Prior Publication Data
US 2013/0210943 A1    Aug. 15, 2013

Related U.S. Application Data

(62) Division of application No. 12/936,610, filed as application No. PCT/JP2009/056650 on Mar. 31, 2009, now Pat. No. 8,685,591.

(30) Foreign Application Priority Data

Apr. 9, 2008  (JP) .................. 2008-101764

(51) Int. Cl.
*H01M 8/10* (2016.01)
*H01M 8/04* (2016.01)
(Continued)

(52) U.S. Cl.
CPC ............. *B01J 39/20* (2013.01); *C08J 5/2237* (2013.01); *H01B 1/122* (2013.01); *H01M 4/8807* (2013.01);
(Continued)

(58) Field of Classification Search
CPC ........... H01M 8/1081; H01M 1/1039; H01M 1/1018
See application file for complete search history.

(56) References Cited

U.S. PATENT DOCUMENTS 4,433,082 A   2/1984   Grot
6,197,903 B1  3/2001   Maccone et al.
(Continued)

FOREIGN PATENT DOCUMENTS

EP    1702670    9/2006
GB    1286859    8/1972
(Continued)

OTHER PUBLICATIONS

Office Action issued in U.S. Appl. No. 12/936,610 dated Jul. 22, 2013.
(Continued)

*Primary Examiner* — Rena L Dye
(74) *Attorney, Agent, or Firm* — Morgan, Lewis & Bockius LLP

(57) ABSTRACT

The disclosure includes a method for producing a dispersion composition of fluorine-containing ion exchange resin comprising a copolymer represented by formula:

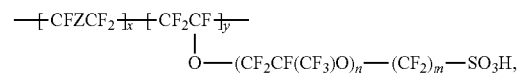

wherein x and y represent numbers satisfying 0≤x<1, 0≤y<1, and x+y=1; Z represents H, Cl, F, or a perfluoroalkyl group having 1 to 3 carbon atoms; m represents an integer of 0 to 12; and n represents an integer of 0 to 2.

6 Claims, 1 Drawing Sheet

(51) Int. Cl.
  *B01J 49/00* (2006.01)
  *B01J 39/20* (2006.01)
  *C08J 5/22* (2006.01)
  *H01B 1/12* (2006.01)
  *H01M 4/88* (2006.01)
  *H01M 8/02* (2016.01)

(52) U.S. Cl.
  CPC ......... *H01M 8/0239* (2013.01); *H01M 8/0241* (2013.01); *H01M 8/1023* (2013.01); *H01M 8/1039* (2013.01); *H01M 8/1072* (2013.01); *H01M 8/1081* (2013.01); *C08J 2327/18* (2013.01); *H01M 8/1018* (2013.01); *H01M 2300/0082* (2013.01); *Y02E 60/521* (2013.01); *Y02P 70/56* (2015.11)

(56) References Cited

U.S. PATENT DOCUMENTS

| | | |
|---|---|---|
| 6,552,093 B1 | 4/2003 | Curtin et al. |
| 2004/0067401 A1 | 4/2004 | Hasegawa et al. |
| 2004/0099527 A1 | 5/2004 | Nakayama |
| 2005/0143540 A1 | 6/2005 | Terada et al. |
| 2006/0194703 A1 | 8/2006 | Tatemoto et al. |
| 2007/0092800 A1 | 4/2007 | Hinokuma et al. |

FOREIGN PATENT DOCUMENTS

| | | |
|---|---|---|
| JP | 48-13333 B | 4/1973 |
| JP | 57-192464 | 11/1982 |
| JP | 2000-159965 | 6/2000 |
| JP | 2001-504872 | 4/2001 |
| JP | 2005-082748 | 3/2005 |
| JP | 2005-082749 | 3/2005 |
| JP | 2005082749 A * | 3/2005 |
| JP | 2006-257423 | 9/2006 |
| WO | 2004/005377 | 1/2004 |
| WO | 2004/078842 | 9/2004 |
| WO | 2008/082497 A | 7/2008 |

OTHER PUBLICATIONS

Search Report issued in corresponding European Patent Application No. 09730519.7 dated Jul. 18, 2013.

* cited by examiner

DISPERSION COMPOSITION OF FLUORINE-CONTAINING ION EXCHANGE RESIN

TECHNICAL FIELD

The present invention relates to a dispersion composition of fluorine-containing ion exchange resin, a method for producing the same, an electrolyte membrane for a polymer electrolyte fuel cell, and a gas diffusion electrode and a fuel cell for a polymer electrolyte fuel cell.

BACKGROUND ART

In recent years, an electrolyte membrane and an electrode for a polymer electrolyte fuel cell have been highly demanded. A dispersion composition of fluorine-containing ion exchange resin having a sulfonic acid functional group (hereinafter simply referred to as a "fluorine-containing ion exchange resin" at times) has been used for the production or repairing of electrolyte membranes for polymer electrolyte fuel cells, the production of electrodes containing catalyst particles, and the like.

A dispersion composition of ion exchange resin has been required to have low viscosity in a higher concentration, so that it can be an easy-to-use material for electrolyte membranes and electrodes.

Typical examples of a dispersion composition of fluorine-containing ion exchange resin having a sulfonic acid functional group include Nafion® Dispersion Solution (manufactured by DuPont, U.S.A.) and Aciplex®-SS (manufactured by Asahi Kasei Chemicals Corporation). Since the dispersibility of such fluorine-containing ion exchange resin having a sulfonic acid functional group in a solvent is extremely low, dispersion compositions produced by dispersing fluorine-containing ion exchange resins in solvents according to various techniques have been proposed, so far.

For example, Patent Document 1 discloses a solution of a sulfonic acid-containing fluorocarbon polymer in alcohol.

In addition, Patent Document 2 discloses a liquid composition of perfluoro ion exchange polymer having an equivalent weight of from 1025 to 1500.

Moreover, Patent Document 3 discloses a highly fluorinated ion exchange polymer particle-containing composition, which has been subjected to a dispersion treatment using a dispersion medium containing water, or water and benzene.

Patent Document 4 discloses a dispersion liquid of a sulfonic acid perfluoro copolymer produced by a homogenization method using a disperser, and Patent Document 5 discloses a dispersion liquid of a sulfonic acid perfluoro copolymer, which is produced by a method comprising performing a washing step in water under heating/pressurizing conditions, and then performing a dispersion treatment.

[Patent Document 1] Japanese Patent Publication No. 48-13333

[Patent Document 2] Japanese Patent Laid-Open No. 57-192464

[Patent Document 3] Published Japanese translations of PCT International publication No. 2001-504872

[Patent Document 4] Japanese Patent Laid-Open No. 2005-82749

[Patent Document 5] Japanese Patent Laid-Open No. 2005-82748

DISCLOSURE OF THE INVENTION

Problems to be Solved by the Invention

However, all of Patent Documents 1, 2, 4, and 5 specifically disclose a dispersion composition comprising a fluorine-containing ion exchange resin in a low concentration. Moreover, Patent Document 3 specifically discloses a dispersion composition obtained by a dispersion treatment at a high temperature of more than 230° C.

Since the polymer backbone of a fluorine-containing ion exchange resin is entirely fluorinated, it exhibits extremely high chemical durability, and thus it can be used under severe conditions. Among others, if a fluorine-containing ion exchange resin with a low equivalent weight is used as a material for electrolyte membranes and electrodes, it causes high protonic conductivity, and thus it is able to achieve a high output as a fuel cell. Thus, it has been highly desired to produce a highly-concentrated, low-viscosity dispersion composition, using a fluorine-containing ion exchange resin with a low equivalent weight as a raw material.

Under the aforementioned circumstances, it is an object of the present invention to provide a dispersion composition of fluorine-containing ion exchange resin, which is a liquid composition in which the fluorine-containing ion exchange resin is dispersed and which has an extremely low viscosity even in a case in which the concentration of a fluorine-containing ion exchange resin is increased by a concentration operation.

Means for Solving the Problems

As a result of intensive studies directed towards achieving the aforementioned object, the present inventors have found that the aforementioned object can be achieved with a dispersion composition of fluorine-containing ion exchange resin, which comprises a fluorine-containing ion exchange resin having specific repeating units and having an equivalent weight in the specific range and a solvent containing water, wherein the abundance ratio of a resin having a particle size of 10 μm or more in the fluorine-containing ion exchange resin is adjusted within a specific range.

Moreover, the inventors have also found that a gas diffusion electrode for a fuel cell, which is excellent in current-voltage characteristics during the actuation of the cell, can be produced by using the aforementioned dispersion composition, thereby completing the present invention.

Specifically, the present invention provides a dispersion composition of fluorine-containing ion exchange resin, a method for producing the same and an electrolyte membrane for a polymer electrolyte fuel cell and a gas diffusion electrode for a polymer electrolyte fuel cell which are produced by using the dispersion composition of fluorine-containing ion exchange resin, as described below.

[1] A dispersion composition of fluorine-containing ion exchange resin, which comprises: a fluorine-containing ion exchange resin having a repeating unit represented by the following formulae (1) and (2) and having an equivalent weight of 400 to 1000 g/eq; and a solvent comprising water, $—(CFZCF_2)—$         (1)

$—(CF_2CF)—$
$\quad\quad|$
$\quad\quad O—(CF_2CF(CF_3)O)_n—(CF_2)_m—SO_3H$   (2)

wherein Z represents H, Cl, F, or a perfluoroalkyl group having 1 to 3 carbon atoms; m represents an integer of 0 to 12; and n represents an integer of 0 to 2, and wherein an abundance ratio of a resin having a particle size of 10 μm or more in the fluorine-containing ion exchange resin is 0.1% to 80% by volume.

[2] The dispersion composition according [1] above, wherein the viscosity ηd (mPa·s) of the dispersion composition is within a range of formula (I): $\eta d \leq \exp(0.26 \times Cd)$ wherein Cd represents a concentration (mass %) of the fluorine-containing ion exchange resin.

[3] The dispersion composition according to [1] or [2] above, which comprises 15% to 45% by mass of the fluorine-containing ion exchange resin.

[4] The dispersion composition according to any one of [1] to [3] above, wherein a melt flow rate of a precursor of the fluorine-containing ion exchange resin is 0.01 to 100 g/10 minutes.

[5] The dispersion composition according to any one of [1] to [4] above, wherein the fluorine-containing ion exchange resin comprises a copolymer represented by the formula (2) wherein n=0 and m=2.

[6] An electrolyte membrane used in a polymer electrolyte fuel cell, which is produced using the dispersion composition according to any one of [1] to [5] above.

[7] A gas diffusion electrode for a polymer electrolyte fuel cell, which is produced using the dispersion composition according to any one of [1] to [5] above.

[8] A fuel cell, which comprises the electrolyte membrane for a polymer electrolyte fuel cell according to [6] above and/or the gas diffusion electrode for a polymer electrolyte fuel cell according to [7] above.

[9] A method for producing a dispersion composition of fluorine-containing ion exchange resin comprising a copolymer having a repeating unit represented by the following formulae (1) and (2):

$—(CFZCF_2)—$         (1)

$—(CF_2CF)—$
$\quad\quad|$
$\quad\quad O—(CF_2CF(CF_3)O)_n—(CF_2)_m—SO_3H$   (2)

wherein Z represents H, Cl, F, or a perfluoroalkyl group having 1 to 3 carbon atoms; m represents an integer of 0 to 12; and n represents an integer of 0 to 2, and wherein the method comprises the steps of:

mixing 1% by mass or more and less than 15% by mass of the fluorine-containing ion exchange resin having an equivalent weight of from 400 to 1000 g/eq into a mixed solvent containing 50.1% to 99.9% by mass of water and 0.1% to 49.9% by mass of alcohol;

subjecting an aqueous composition comprising the fluorine-containing ion exchange resin to a dispersion treatment; and concentrating the aqueous composition subjected to the dispersion treatment, so that a concentration Cd (mass %) of the fluorine-containing ion exchange resin becomes 15% by mass or more and 45% by mass or less.

[10] The method for producing the dispersion composition according to [9] above, wherein the alcohol is one or more of alcohols selected from the group consisting of methanol, ethanol, 1-propanol, and 2-propanol.

[11] The method for producing the dispersion composition according to [9] or [10] above, wherein the aqueous composition is subjected to the dispersion treatment at 220° C. or less.

[12] The method for producing the dispersion composition according to any one of [9] to [11] above, wherein the fluorine-containing ion exchange resin comprises a copolymer represented by the formula (2) wherein n=0 and m=2.

Advantage of the Invention

According to the present invention, there can be obtained a dispersion composition, which comprises a fluorine-containing ion exchange resin in a high concentration and which has a low viscosity.

BEST MODE FOR CARRYING OUT THE INVENTION

The best mode for carrying out the present invention (hereinafter referred to as the present embodiment) will be described in detail below. It is to be noted that the present invention is not limited to the embodiment as described below, and that it may be modified and carried out in various way within the range of the gist thereof.

The dispersion composition of fluorine-containing ion exchange resin (hereinafter simply referred to as a "dispersion composition" at times) of the present embodiment is a dispersion composition of fluorine-containing ion exchange resin, which comprises: a fluorine-containing ion exchange resin having a repeating unit represented by the following formulae (1) and (2) and having an equivalent weight of 400 to 1000 g/eq; and a solvent containing water, $—(CFZCF_2)—$         (1)

$—(CF_2CF)—$
$\quad\quad|$
$\quad\quad O—(CF_2CF(CF_3)O)_n—(CF_2)_m—SO_3H$   (2)

wherein Z represents H, Cl, F, or a perfluoroalkyl group containing 1 to 3 carbon atoms; m represents an integer of 0 to 12; and n represents an integer of 0 to 2, and wherein an abundance ratio of a resin having a particle size of 10 μm or more in the fluorine-containing ion exchange resin is 0.1% to 80% by volume.

Since the dispersion composition of the present embodiment has the above-mentioned structure, it can maintain a low-viscosity homogeneous state even in a case in which the concentrate of the resin is increased by a concentration operation. In addition, because of a high concentration of resin, a solvent can be removed in a shorter time when a membrane is formed by a solution casting method using the dispersion composition, so as to improve the productivity of an electrolyte membrane. Moreover, since the dispersion composition has low viscosity, it is excellent in terms of the dispersibility of catalyst particles in the production of an electrode. Thereby, the power generation characteristics of a fuel cell can be enhanced.

(Fluorine-Containing Ion Exchange Resin)

The fluorine-containing ion exchange resin used in the present embodiment can be obtained by hydrolyzing a fluorine-containing ion exchange resin precursor comprising a copolymer of an olefin fluoride monomer represented by the following formula (3) and a vinyl fluoride compound represented by the following formula (4):

wherein Z represents H, Cl, F, or a perfluoroalkyl group containing 1 to 3 carbon atoms, wherein m represents an integer of 0 to 12; n represents an integer of 0 to 2; and W represents a functional group that can be converted to $SO_3H$ by hydrolysis.

Herein, the functional group W that can be converted to $SO_3H$ by hydrolysis is not particularly limited. Examples of such functional group W include $SO_2F$, $SO_2Cl$, and $SO_2Br$.

A fluorine-containing ion exchange resin precursor comprising a copolymer represented by the above formulae (3) and (4) wherein $W=SO_2F$ and $Z=F$, is preferably used.

The above described fluorine-containing ion exchange resin precursor can be synthesized by the known method. Examples of such known method include: a method, which comprises filling and dissolving the olefin fluoride represented by the above formula (3) (hereinafter simply referred to as an "olefin fluoride" at times) and the vinyl fluoride compound represented by the formula (4) (hereinafter simply referred to as a "vinyl fluoride compound" at times) in a polymerization solvent such as a fluorine-containing hydrocarbon, so that they are reacted and polymerized (solution polymerization); a method, which comprises polymerizing the aforementioned olefin fluoride with the aforementioned vinyl fluoride compound serving as a polymerization solvent, without using a solvent such as a fluorine-containing hydrocarbon (mass polymerization); a method, which comprises filling the aforementioned olefin fluoride and the aforementioned vinyl fluoride compound in an aqueous solution of a surfactant used as a medium, so that they are reacted and polymerized (emulsion polymerization); a method, which comprises filling and emulsifying the aforementioned olefin fluoride and the aforementioned vinyl fluoride compound in an aqueous solution of a surfactant and an emulsification aid such as an alcohol, so that they are reacted and polymerized (miniemulsion polymerization, microemulsion polymerization); and a method, which comprises filling and suspending the aforementioned olefin fluoride and the aforementioned vinyl fluoride compound in an aqueous solution of a suspension stabilizer, so that they are reacted and polymerized (suspension polymerization). In the present embodiment, products produced by any types of polymerization methods can be used as a fluorine-containing ion exchange resin precursor.

As a fluorine-containing hydrocarbon used as a polymerization solvent in the above described solution polymerization, a group of compounds generically referred to as "Freons" such as trichlorotrifluoroethane and 1,1,1,2,3,4,4,5,5,5-decafluoropentane can be preferably used.

In the present embodiment, as an indicator of the polymerization degree of a fluorine-containing ion exchange resin, the melt flow rate of a fluorine-containing ion exchange resin precursor, which is measured at a temperature of 270° C., with an orifice having an inner diameter of 2.09 mm and a length of 8 mm, under a load of 2.16 kg, can be preferably used. The melt flow rate of the fluorine-containing ion exchange resin precursor of the present embodiment is preferably 0.01 g/10 minutes or more, more preferably 0.1 g/10 minutes or more, and further preferably 0.3 g/10 minutes or more. Moreover, the melt flow rate of the fluorine-containing ion exchange resin precursor of the present embodiment is preferably 100 g/10 minutes or less, more preferably 50 g/10 minutes or less, and further preferably 10 g/10 minutes or less. When the melt flow rate of the fluorine-containing ion exchange resin precursor is 0.01 g/10 minutes or more, the dispersion composition of the present embodiment can be easily obtained. Furthermore, since the viscosity of the obtained dispersion composition becomes low, the dispersion composition may be easily handled when an electrolyte membrane or an electrode is produced. On the other hand, when the melt flow rate is 100 g/10 minutes or less, the strength of an electrolyte membrane produced with the dispersion composition tends to be high. Further, since the melt flow rate that is 100 g/10 minutes or less can suppress the water-absorbing property of a resin, when the dispersion composition is used as a binder material for a gas diffusion electrode, it is able to suppress flooding occurring during the actuation of a fuel cell, and as a result, good output may be obtained under a wide range of power generation conditions.

The fluorine-containing ion exchange resin precursor can be subjected to extrusion molding with a nozzle, a die, etc., using an extruder. Herein, a molding method and the form of a molded product are not particularly limited. In order to speed up operations in the after-mentioned hydrolysis treatment and acid treatment, such molded product is preferably in the form of a pellet with a size of $0.5\ cm^3$ or less. It may also be a powdery or flake-form resin obtained after polymerization.

The fluorine-containing ion exchange resin of the present embodiment can be produced by performing a hydrolysis treatment, for example, by immersing the aforementioned fluorine-containing ion exchange resin precursor in a basic reaction solution.

The basic reaction solution used in the hydrolysis treatment is not particularly limited. An aqueous solution of the hydroxide of alkaline metal or alkaline-earth metal, such as sodium hydroxide or potassium hydroxide, is preferable. The content percentage of the hydroxide of alkaline metal or alkaline-earth metal in the aqueous solution is not particularly limited. It is preferably 10% to 30% by mass or less.

The above described basic reaction solution preferably comprises swellable organic solvents including alcohols such as methyl alcohol or ethyl alcohol, ketones such as acetone, dipolar solvents such as dimethyl sulfoxide (hereinafter referred to as "DMSO"), N,N-dimethylacetamide (hereinafter referred to as "DMAC") or N,N-dimethylformamide (hereinafter referred to as "DMF"), and the like.

The content percentage of the above described organic solvent is preferably 1% to 30% by mass or less, with respect to the mass of a mixed solvent in the basic reaction solution.

The hydrolysis temperature applied to the hydrolysis treatment varies depending on the type of a solvent used in the hydrolysis treatment, the composition of a solvent, etc. As the hydrolysis temperature is set at high, the treatment time can be shortened. In terms of the handleability of the fluorine-containing ion exchange resin precursor, the hydrolysis temperature is preferably 20° C. to 160° C.

The reaction time in the hydrolysis treatment is not particularly limited, as long as it is a time sufficient for the conversion of all the functional groups W in the above described fluorine-containing ion exchange resin precursor to $SO_3K$ or $SO_3Na$ by hydrolysis. The reaction time is preferably 0.5 to 48 hours.

The fluorine-containing ion exchange resin of the present embodiment can be produced by hydrolyzing a fluorine-containing ion exchange resin precursor in a basic reaction solution, then washing the resultant with water or the like, as necessary, and then performing an acid treatment thereon.

The acid used in such acid treatment is not particularly limited, as long as it is mineral acid such as hydrochloric acid, sulfuric acid or nitric acid, or organic acid such as oxalic acid, acetic acid, formic acid or trifluoroacetic acid. Moreover, the concentration of an acid used in such acid treatment is not particularly limited, either. By this acid treatment, the fluorine-containing ion exchange resin precursor is protonated to form an $SO_3H$ body. Thereafter, it is washed with water or the like, as necessary.

The fluorine-containing ion exchange resin of the present embodiment is not particularly limited, as long as it has a repeating unit represented by the following formulae (1) and (2) and has an equivalent weight of 400 to 1000 g/eq, $$—(CFZCF_2)— \quad (1)$$

(2)

wherein Z represents H, Cl, F, or a perfluoroalkyl group having 1 to 3 carbon atoms; m represents an integer of 0 to 12; and n represents an integer of 0 to 2.

When the structure of a side chain having an $SO_3H$ group in the above formula (2) is short, the crystallinity of the obtained fluorine-containing ion exchange resin is improved, and as a result, an electrolyte membrane or the like produced from the dispersion composition of the present embodiment tends to have excellent heat resistance and mechanical strength. Thus, the fluorine-containing ion exchange resin preferably comprises a copolymer represented by the above formula (2) wherein n=0 and m=2.

Moreover, the fluorine-containing ion exchange resin preferably comprises a copolymer represented by the following formula (5):

(5)

wherein x and y represent integers satisfying 0≤x<1 and 0≤y<1, and x+y=1; m represents an integer of 0 to 12; and n represents an integer of 0 to 2.

In the present embodiment, a fluorine-containing ion exchange resin represented by the above formula (5) wherein n is 0, is preferably used from the viewpoint of the strength of an electrolyte membrane.

The equivalent weight of the fluorine-containing ion exchange resin of the present embodiment is 400 g/eq or more, preferably 450 g/eq or more, and more preferably 500 g/eq. The upper limit of the equivalent weight is 1000 g/eq, preferably 950 g/eq or less, and more preferably 900 g/eq. Because of the equivalent weight that is 1000 g/eq or less, an electrolyte membrane having excellent power generation performance and the like can be obtained. On the other hand, because of the equivalent weight that is 400 g/eq or more, an electrolyte membrane having a low water-absorbing property and excellent mechanical strength, and the like, can be obtained. Herein, the equivalent weight of the fluorine-containing ion exchange resin can be measured in accordance with the method described in after-mentioned examples.

(Dispersion Composition of Fluorine-Containing Ion Exchange Resin)

The dispersion composition of the present embodiment comprises the above described fluorine-containing ion exchange resin and a solvent containing water. Herein, the content percentage of the fluorine-containing ion exchange resin in the dispersion composition is preferably 15% to 45% by mass, more preferably 17% to 43% by mass, and further preferably 20% to 40% by mass. If the content percentage of the fluorine-containing ion exchange resin is 15% by mass or more, the amount of a solvent to be removed during the production of an electrolyte membrane and an electrode using the dispersion composition tends to be decreased, and thus it is preferable. On the other hand, if the content percentage of the fluorine-containing ion exchange resin is 45% by mass or less, the viscosity of the obtained dispersion composition is stable over time. As a result, an abnormal increase in the viscosity or partial gelation occurring during transportation or storage tends to be prevented, and thus it is preferable.

Moreover, the content percentage of the solvent containing water in the dispersion composition is preferably 55% to 85% by mass, more preferably 57% to 83% by mass, and further preferably 60% to 80% by mass.

(Dispersibility of Fluorine-Containing Ion Exchange Resin)

The dispersibility of the fluorine-containing ion exchange resin in the dispersion composition of the present embodiment can be determined based on particle size distribution that is measured using a dynamic light scattering photometer.

If it is assumed that the fluorine-containing ion exchange resin in the dispersion composition has a spherical structure, that particles in the dispersion composition have particle size distribution, and that there is no correlation between the particles, the time correlation function G1(t) of scattering light obtained by dynamic light scattering is represented by Formula (II) as shown below. In the Formula (II) and Formula (III), C indicates a constant, Pi indicates a particle size distribution function, Di represents a translational diffusion coefficient, n represents the refractive index of a solvent, θ represents a scattering angle, λ, represents the wavelength of an incident light, and t represents a time.

$$G1(t) = C\sum_i P_i \exp(-D_i q^2 t) \quad \text{Formula (II)}$$

$$q = 4\pi\eta \sin(\theta/2)/\lambda \quad \text{Formula (III)}$$

Further, Di in the Formula (II) is related to the particle size di according to Formula (IV) as shown below. In the Formula (IV), κ represents a Boltzmann constant, T represents a measurement temperature, and η represents the viscosity of a solvent.

$$Di = kT/(3\pi\eta di) \quad \text{Formula (IV)}$$

Accordingly, the particle size distribution of particles in the dispersion composition can be obtained by fitting the $G1(t)$ obtained by dynamic light scattering measurement with the Formula (II).

However, as a matter of fact, the dispersion composition comprises a large number of particles having various particle sizes, and thus it is difficult to uniquely determine such particle size distribution. Hence, analyses are carried out, assuming that only 3 types of particles are present in the dispersion composition; namely, particles with a particle size of 0.5 μm or less (hereinafter referred to as small particles), particles with a particle size from 0.5 μm to 10 μm (hereinafter referred to as medium particles), and particles with a particle size of 10 μm or more (hereinafter referred to as large particles). That is to say, by fitting the $G1(t)$ with formula (V) as shown below, the particle size of small particles, d1; the abundance ratio of the small particles, P1/(P1+P2+P3); the particle size of medium particles, d2; the abundance ratio of the medium particles, P2/(P1+P2+P3); the particle size of large particles, d3; and the abundance ratio of the large particles, P3/(P1+P2+P3) can be determined. However, for such fitting, restrictions are imposed on the values of D1, D2, and D3, so that the particle sizes d1, d2, and d3 obtained by the Formula (IV) can be within the particle size ranges of small particles, medium particles, and large particles, respectively.

$$G1(t) = C\{(P_1 \exp(-D_1 q^2 t) + P_2 \exp(-D_2 q^2 t) + P_3 \exp(-D_3 q^2 t)\} \quad \text{Formula (IV)}$$

The aforementioned analysis requires the exact value of $G1(t)$. In the measurement, it is necessary to select conditions under which the $G1(t)$ value can be measured with high precision.

According to the above described method, it is possible to determine the ratio of the fluorine-containing ion exchange resin having a dispersed particle size of 10 μm or more, namely, P3/(P1+P2+P3). This value depends on a solid content in the dispersion liquid, similar to the viscosity. Thus, there is no significance to compare the values between dispersion liquids having different solid contents. Accordingly, when 10% by mass or more of solid is contained in the dispersion liquid, the solution is diluted with purified water. When less than 10% by mass of solid is contained in the dispersion liquid, the solution is concentrated according to a known method to a concentration of 10% by mass. Thereafter, the above described measurement is carried out.

In the case of the dispersion composition of the present embodiment, the abundance ratio of large particles measured by the above described method, namely, the abundance ratio of a resin having a particle size of 10 μm or more in the fluorine-containing ion exchange resin is 0.1% to 80% by volume, preferably 5% to 75% by volume, and more preferably 10% to 60% by volume. On the other hand, the abundance ratio of small particles and medium particles, namely, the abundance ratio of a resin having a particle size of less than 10 μm in the fluorine-containing ion exchange resin is 20% to 99.9% by volume, preferably 25% to 95% by volume, and more preferably 40% to 90% by volume.

The reasons why there is an optimal range for the abundance ratio of a resin having a specific particle size are as follows. First, if the abundance ratio of fluorine-containing ion exchange resin particles having a particle size of 10 μm or more is 80% by volume or less, namely, if the abundance ratio of small particles and medium particles in a dispersion liquid is high, sulfonic acid groups contained in the ion exchange resin become electrostatically repulsive to one another, and thus the particles do not become reassociated with one another even when the concentration of the fluorine-containing ion exchange resin is improved by concentration or the like. As a result, the viscosity of the dispersion liquid can be kept low. When a membrane is formed from a dispersion liquid containing no large particles, the membrane has cracks, and a continuous membrane cannot be formed. In contrast, if the abundance ratio of fluorine-containing ion exchange resin particles having a particle size of 10 μm or more is 0.1% by volume or more, a continuous membrane having no cracks can be formed from the dispersion composition of the present embodiment. This is considered because large particles act as glue to bind small particles and medium particles, so as to absorb stress.

(Viscosity of Dispersion Composition of Fluorine-Containing Ion Exchange Resin)

The viscosity ηd (mPa·s) of the dispersion composition of the present embodiment preferably satisfies formula (I): ηd≤exp (0.26×Cd), in which the concentration Cd (mass %) of the fluorine-containing ion exchange resin is used. If the viscosity is relatively low with respect to the concentration, the concentration of a resin can be improved during the formation of a membrane. Accordingly, the viscosity range satisfies preferably ηd≤exp (0.25×Cd), and more preferably ηd≤exp (0.24×Cd). In addition, the lower limit of the viscosity of the dispersion composition is not particularly limited. Since the viscosity of water at 25° C. is 0.89 mPa·s, the lower limit of the viscosity of the dispersion composition is substantially 0.89 mPa·s or more.

When the content percentage of the fluorine-containing ion exchange resin in the dispersion composition of the present embodiment is low, the viscosity of the dispersion composition is equivalent to that of water, and thus, the dispersibility of a catalyst becomes extremely good. When the content percentage of the ion exchange resin is increased, the concentration of the ion exchange resin is preferably increased while maintaining a homogeneous solution state within an applicable viscosity range; namely, the amount of a solvent contained is preferably decreased. As a result, when an electrolyte membrane is formed, a drying step of removing such solvent can be preferably carried out at a lower temperature or in a shorter time.

When a gas diffusion electrode is produced using the dispersion composition of the present embodiment, the surface of a catalyst can be coated with an extremely thin, homogeneous fluorine-containing ion exchange resin, and thus, resistance during power generation becomes small. As a result, a high voltage can be obtained even at a high current density.

(Method for Producing Dispersion Composition of Fluorine-Containing Ion Exchange Resin)

The method for producing a dispersion composition of fluorine-containing ion exchange resin of the present embodiment, which comprises a copolymer having repeating units represented by the following formulae (1) and (2):

—(CFZCF$_2$)— (1)

(2)

wherein Z represents H, Cl, F, or a perfluoroalkyl group having 1 to 3 carbon atoms; m represents an integer of 0 to 12; and n represents an integer of 0 to 2, comprises the steps of:

mixing 1% by mass or more to less than 15% by mass of the fluorine-containing ion exchange resin having an equivalent weight of 400 to 1000 g/eq into a mixed solvent containing 50.1% to 99.9% by mass of water and 0.1% to 49.9% by mass of alcohol(s);

subjecting an aqueous composition comprising the fluorine-containing ion exchange resin to a dispersion treatment; and concentrating the thus dispersed aqueous composition, so that the concentration Cd (mass %) of the fluorine-containing ion exchange resin becomes 15% by mass or more to 45% by mass or less.

According to the method for producing the dispersion composition comprising the above described dispersion treatment step and the above described concentration step, there can be produced the dispersion composition of fluorine-containing ion exchange resin having a viscosity $\eta d$ (mPa·s) that is within a range represented by formula (I): $\eta d \leq \exp(0.26 \times Cd)$.

In the above described mixing step of the present embodiment, the fluorine-containing ion exchange resin and the aforementioned mixed solvent are added to a pressure vessel equipped with an appropriate stirrer, and they are then mixed.

Preferably, the air in the pressure vessel has previously been substituted with inert gas such as nitrogen. In this occasion, the fluorine-containing ion exchange resin is added thereto to a concentration of less than 1% to 15% by mass, so that the viscosity of an aqueous composition comprising the fluorine-containing ion exchange resin in the dispersion treatment step can be appropriately controlled. The concentration of the fluorine-containing ion exchange resin is preferably 1% by mass or more, more preferably 2% by mass or more, and further preferably 3% by mass or more. In addition, as to the upper limit of the concentration of the fluorine-containing ion exchange resin, it is preferably 15% by mass or less, more preferably 14% by mass or more, and further preferably 13% by mass or less.

In the dispersion treatment step, the temperature of the liquid may be preferably set at 220° C. or less, and dispersion may be carried out by heating and stirring the liquid for 1 to 24 hours. The temperature applied in the dispersion treatment is preferably 100° C. or more, more preferably 110° C. or more, and further preferably 120° C. or more. In addition, as to the upper limit of the temperature, it is preferably 220° C. or less, more preferably 210° C. or less, and further preferably 200° C. or less. The temperature applied in the dispersion treatment is preferably 100° C. or more because the dispersibility of the fluorine-containing ion exchange resin is enhanced in such temperature range. Also, the temperature is preferably 220° C. or less from the viewpoint of pressure during the dispersion treatment.

In the present embodiment, as a material for the pressure vessel in which the mixing of the fluorine-containing ion exchange resin and the dispersion treatment are carried out, SUS304, SUS316, SUS329, SUS430, SUS444, HASTELLOY®, Inconel®, Stellite®, and the like are preferably used. Moreover, a pressure vessel having an inner cylinder made of glass or polytetrafluoroethylene (hereinafter referred to as "PTFE") therein, or a pressure vessel, the inner wall of which has been treated with PTFE or by glass lining, may also be used, as necessary. A specific example of such pressure vessel is a TEM-D apparatus manufactured by Taiatsu Techno Corporation. If the dispersed treatment is carried out on the fluorine-containing ion exchange resin, using a pressure vessel which comprises an inner cylinder made of glass or PTFE, or which has been subjected to a glass or PTFE lining treatment, the elution of metal ions from ingredients such as Fe or Ni contained in the pressure vessel itself can be preferably prevented. There may be a fear that an electrolyte membrane or an electrode produced using a dispersion composition comprising the above-mentioned metal ions has significantly decreased durability to chemical degradation caused by hydrogen peroxide generated during the actuation of a fuel cell. In order to prevent such significant decrease in durability, it is necessary to carry out a treatment for removing metal ions using mineral acids such as hydrochloric acid, nitric acid or sulfuric acid, or organic acids such as acetic acid or oxalic acid, after the formation of a membrane or the production of an electrode. Such removal treatment possibly makes the production process complicated.

In the present embodiment, a known concentration step such as azeotropic distillation, thin film distillation, or ultrafiltration is carried out after completion of the dispersion treatment, so as to produce a dispersion composition comprising a fluorine-containing ion exchange resin at a content percentage of 15% by mass or more to 45% by mass or less. Moreover, if an excessive shearing force is allowed to act on the dispersion composition in the concentration step, the viscosity of the dispersion composition may be increased. In such a case, it is difficult to obtain a homogeneously concentrated solution. Accordingly, the concentration method is not particularly limited, but it is preferable to carry out stationary concentration, concentration under moderate stirring at a shearing rate of less than 100 sec$^{-1}$, or a concentration using a rotary evaporator or the like. In this concentration step, the dispersion composition may be converted to a dispersion composition comprising a solvent substantially containing water. Otherwise, the dispersion composition may be diluted by addition of some solvent, and it may be then concentrated. A dispersion composition with higher concentration and low viscosity can be obtained by carrying out a dispersion treatment on the thus obtained dispersion composition of fluorine-containing ion exchange resin several times under the same heating/pressurizing conditions, followed by a concentration step. The concentration of the fluorine-containing ion exchange resin in the second and subsequent dispersion treatment steps is preferably 1% by mass or more, more preferably 2% by mass or more, and further preferably 3% by mass or more. In addition, as to the upper limit of such concentration, it is preferably 40% by mass or less, more preferably 35% by mass or less, and further preferably 30% by mass or less.

In the present embodiment, the concentration of the fluorine-containing ion exchange resin in the dispersion composition, Cd, is preferably 15% by mass or more, more preferably 17% by mass or more, and further preferably 20% by mass or more. In addition, as to the upper limit of the concentration, it is preferably 45% by mass or less, more preferably 43% by mass or less, and further preferably 40% by mass or less.

In the present embodiment, after completion of the dispersion treatment, or after completion of the concentration step following the dispersion treatment, the dispersion composition is filtrated to remove dusts and the like that have been mixed therein during the aforementioned steps. The type of a filtration material is not particularly limited. A material selected from polypropylene, polyester, polytetrafluoroethylene, cellulose and the like, may be then used. The pore size of such filtration material is not particularly limited, either. A filtration material with a pore size selected from the range from 0.5 to 100 μm may be used.

In the present embodiment, when the fluorine-containing ion exchange resin is mixed and dispersed, a mixed solvent containing water and alcohol(s) is used as a solvent.

The alcohol(s) of the present embodiment are preferably alcohol(s) having 1 to 3 carbon atoms because they have a low boiling point. These alcohols may be used singly or as a mixture of two or more types. Specific examples of such alcohol(s) include methanol, ethanol, 1-propanol, and 2-propanol. Of these, methanol and ethanol are preferable. It is considered that the ion exchange resin is swollen with the use of a solvent containing such alcohol(s), and that, as a result, it becomes easily dispersed. In the present embodiment, by using the above described alcohol(s), a dispersion treatment can be carried out at a lower temperature.

In the present embodiment, the concentration of alcohol(s) is 49.9% by mass or less in a mixed solvent containing water and such alcohol(s). The viscosity of the dispersion composition can be decreased by setting the concentration of alcohol(s) at 49.9% by mass or less. As a result, the dispersion composition is able to comprise the fluorine-containing ion exchange resin at a high concentration of 15% by mass or more to 45% by mass or less.

The concentration of alcohol(s) of the present embodiment is preferably 45% by mass or less, and more preferably 40% by mass or less. The lower limit of the concentration of alcohol(s) is not particularly limited. Taking into consideration the homogeneous dispersibility of the fluorine-containing ion exchange resin, the concentration of the alcohol(s) is 0.1% by mass or more, more preferably 1.0% by mass or more, and further preferably 10.0% by mass.

In the present embodiment, the concentration of water is 50.1% to 99.9% by mass in the mixed solvent containing such water and alcohol(s). As to the lower limit, it is preferably 60% by mass or more. As to the upper limit, it is preferably 99.0% by mass or less, and more preferably 90.0% by mass or less.

Diol solvents such as ethylene glycol, 1,2-propylene glycol or 1,3-propylene glycol, dipolar organic solvents such as DMSO, DMAC or DMF, fluorine-containing alcohols, or fluorine-containing ethers, may be mixed into the above described mixed solvent, within a range that does not impair the gist of the present embodiment. The concentration of such compound is preferably 5% by mass or less with respect to the total mass of the mixed solvent.

In the present embodiment, the dispersion composition of fluorine-containing ion exchange resin is produced by combining the dispersion treatment step with the concentration step, using the above described mixed solvent containing water and alcohol(s), so that the produced dispersion composition is able to maintain a homogeneous liquid state, even if it has a high concentration of 45% by mass.

In the present embodiment, the term "liquid state" is used to mean that the viscosity of a solution is 3000 mPa·s or less when measurement is carried out with a type E viscometer at 25° C. The term "homogeneous" is used herein to mean that the dispersion composition contains no gelatinous products at 25° C. Even in the case of a liquid having a viscosity of more than 3000 mPa·s, it is possible to decrease the viscosity by increasing the temperature of the liquid. In this case, however, the liquid contains many gelatinous products, and thus it is not practically used. Accordingly, the upper limit of the viscosity of the dispersion liquid at 25° C. is substantially 3000 mPa·s. This indicates that the composition of a solvent used has a large effect on the dispersibility of the fluorine-containing ion exchange resin. By measuring particle size distribution using the above described dynamic light scattering photometer, a difference between the particle size of a resin contained in the conventional dispersion composition and the particle size of a resin contained in the dispersion composition of the present embodiment can be revealed.

(Electrolyte Membrane for Polymer Electrolyte Cell)

An ion exchange membrane produced using the dispersion composition of fluorine-containing ion exchange resin of the present embodiment can be used as an electrolyte membrane for a polymer electrolyte fuel cell (hereinafter simply referred to as an "electrolyte membrane" at times). In the present embodiment, the thickness of the electrolyte membrane used in a membrane electrode assembly (MEA) is not particularly limited. The thickness of the electrolyte membrane is preferably 50 μm or less. The thickness of the electrolyte membrane that is 50 μm or less can increase the concentration gradient of the amount of water vapor in the electrolyte membrane sandwiched between an anode and a cathode, and thereby, can enhance characteristics as a cell. Moreover, the thickness of the electrolyte membrane that is 3 μm or more can reduce the risk of causing short circuit. The thickness of the electrolyte membrane is more preferably 3 to 40 μm, and further preferably 5 to 30 μm.

The present embodiment also relates to a method for producing an electrolyte membrane for a polymer electrolyte fuel cell, in which the above described dispersion composition is used. As such a method for producing an electrolyte membrane for a polymer electrolyte fuel cell, there is applied a method, which comprises: adding a polymer electrolyte-containing solution to a vessel such as a petri dish; heating it in an oven or the like, as necessary, so that a solvent is partially distilled away; and then taking the resultant off from the vessel, so as to obtain a membrane product. Moreover, a polymer electrolyte-containing solution may be applied over a glass plate, a film, or the like, to make a sheet-like coated membrane according to a cast membrane formation method, while controlling the thickness of the membrane using an apparatus such as a blade coater, a gravure coater or a comma coater, having a component such as a blade, an air knife or a reverse roll so as to achieve a uniform thickness. Furthermore, it may also be possible that a membrane is continuously formed by continuous casting, so as to obtain a long film-state membrane.

The aforementioned film is not particularly limited, and it may be selected from: polyester such as polyethylene terephthalate (PET), polybutylene terephthalate (PBT), polyethylene naphthalate (PEN) and liquid crystal polyesters, triacetyl cellulose (TAC), polyalylate, polyether, polycarbonate (PC), polysulfone, polyethersulfone, cellophane, aromatic polyamide, polyvinyl alcohol, polyethylene (PE), polypropylene (PP), polyvinyl chloride (PVC), polystyrene (PS), acrylonitrile-butadiene-styrene copolymer (ABS), polymethyl methacrylate (PMMA), polyamide, polyacetal (POM), polyphenylene terephthalate (PPE), polybutylene terephthalate (PBT), polyphenylene sulfide (PPS), polyamide imide (PAI), polyetheramide (PEI), polyether ether ketone (PEEK), polyimide (PI), polymethylpentene (PMP), polytetrafluoroethylene (PTFE), fluorinated ethylene-propylene (FEP), a tetrafluoroethylene-ethylene (ETFE) copolymer, polyvinylidene fluoride (PVDF), polybenzazole (PBZ), polybenzoxazole (PBO), polybenzothiazole (PBT), polybenzimidazole (PBI), polyparaphenylene terephthalimide (PPTA), and the like.

Moreover, there can also be applied an extrusion method for forming a membrane, which comprises extruding a polymer electrolyte-containing solution from a die. According to such extrusion method as well, a sheet or long membrane can be formed. Furthermore, it may also be possible that, using a spray or the like, a polymer electrolyte is precipitated in a support with a releasability, and that a membrane is then formed by drying. Further, if necessary, the membrane is consolidated with a heating press or the like.

The thickness of a membrane that has been formed by a cast method or extrusion may be further controlled again with a blade or an air knife, before the after-mentioned drying treatment.

Still further, as a method of removing a solvent existing in a membrane formed, a solvent immersion method comprising adding the formed membrane into an adequate solution or solvent, so as to remove a solvent from the membrane, can be adopted, for example.

The above described membrane formation methods may be selected depending on the viscosity of a solution and other properties. Thus, the membrane formation method is not limited thereto. In addition, membranes may be formed from polymer electrolyte-containing solutions having different ingredient compositions by arbitrary methods many times, and the thus formed membranes may be then laminated, so as to obtain a multilayered membrane.

Moreover, using the dispersion composition of the present embodiment, an electrolyte membrane, a catalyst layer, and the like can be formed without adding additives such as a membrane formation aid to the dispersion composition.

(Membrane Electrode Assembly Used in Polymer Electrolyte Cell)

In the present embodiment, the thickness of a catalyst layer as a gas diffusion electrode in a membrane electrode assembly is not particularly limited. From the viewpoint of the easiness of gas diffusion in a catalyst layer and the improvement of battery properties, the thickness of a catalyst layer is preferably 20 µm or less, and more preferably homogeneous.

Using the dispersion composition of fluorine-containing ion exchange resin of the present embodiment, a catalyst layer can be formed to have a homogeneous thickness, although it has a thickness of 20 µm or less. If the thickness of such catalyst layer is reduced, the amount of a catalyst existing per unit area is decreased, and it may cause low reactivity. In such a case, if a supported catalyst which is platinum or platinum alloy supported at a high supporting rate is used as a catalyst, the amount of the catalyst is not insufficient although the thickness of the catalyst layer is thin, and thus, the reactivity of an electrode can be kept at high. From the aforementioned viewpoint, the thickness of the catalyst layer is more preferably 1 to 15 µm.

The present embodiment also relates to a method for producing a gas diffusion electrode for a polymer electrolyte fuel cell, in which the above described dispersion composition is used. Such gas diffusion electrode for a polymer electrolyte fuel cell can be produced, for example, by applying a dispersion composition of fluorine-containing ion exchange resin to the surface of a commercially available gas diffusion electrode, and then drying and fixing it at 140° C. in the atmospheric air.

A coating liquid, which comprises the dispersion composition of fluorine-containing ion exchange resin of the present embodiment and catalyst powders in which catalyst metal particles are supported on carbon carriers, is prepared, and the coating liquid is then applied onto a substrate to form a catalyst layer of at least one of an anode and a cathode. The catalyst layer obtained by this method has few defects such as cracks, and it is excellent in smoothness. Since the catalyst layer is formed by removing a solvent (dispersion medium) after the application of the coating liquid, by the improvement of the strength of an ion exchange polymer acting not only as an electrolyte but also as a binder of the catalyst, the cracks of the catalyst layer can be prevented.

Further solvent can be added to the coating liquid. As a solvent to be added to the coating liquid, alcohols, fluorine-containing solvents, and water are preferable. Preferred examples of such solvent are alcohols. An alcohol with a main chain having 1 to 4 carbon atoms is preferable. Examples of such alcohol include methanol, ethanol, n-propanol, isopropanol, and tert-butanol. In addition, the solubility of the fluorine-containing ion exchange resin can be increased by mixing water with such alcohol. Examples of a fluorine-containing solvent include: hydrofluorocarbons such as 2H-perfluoropropane, 1H,4H-perfluorobutane, 2H,3H-perfluoropentane, 3H,4H-perfluoro(2-methylpentane), 2H,5H-perfluorohexane, and 3H-perfluoro(2-methylpentane); fluorocarbons such as perfluoro(1,2-dimethylcyclobutane), perfluorooctane, perfluoroheptane, and perfluorohexane; hydrochlorofluorocarbons such as 1,1-dichloro-1-fluoroethane, 1,1,1-trifluoro-2,2-dichloroethane, 3,3-dichloro-1,1,1,2,2-pentafluoropropane, and 1,3-dichloro-1,1,2,2,3-pentafluoropropane; fluorine-containing ethers such as 1H,4H,4H-perfluoro(3-oxapentane) and 3-methoxy-1,1,1,2,3,3-hexafluoropropane; and fluorine-containing alcohols such as 2,2,2-trifluoroethanol, 2,2,3,3,3-pentafluoro-1-propanol, and 1,1,1,3,3,3-hexafluoro-2-propanol.

In the present embodiment, the concentration of a solid in the coating liquid can be selected, as appropriate, depending on the thickness of a catalyst layer of interest, and thus, it is not particularly limited. In order to form a homogeneous coating layer, the solid is contained at a mass percentage of preferably 1% to 50%, and more preferably 5% to 35%, with respect to the total mass of the coating liquid. The substrate to which the above described coating liquid is applied may be either an ion exchange membrane, or a gas diffusion layer that is disposed outside of the catalyst layer and acts also as a current collector. In addition, the substrate may also be a substrate, which is not a component material of a membrane electrode assembly, but which is prepared, separately. In this case, the substrate may be removed after combining the catalyst layer with the membrane. The type of the substrate that is prepared, separately, is not particularly limited. There can be used a film of a material selected from among polyethylene terephthalate, polyethylene naphthalate, polypropylene, polyethylene, polymethylpentene, polyimide, polyphenylene sulfide, polytetrafluoroethylene, and the like.

In the present embodiment, examples of a method for producing a membrane electrode assembly include: (1) a method, which comprises directly applying the above described coating liquid onto a solid polymer electrolyte membrane, removing a dispersion medium contained in the coating liquid by drying so as to form a catalyst layer, and then sandwiching the catalyst layer with gas diffusion layers; (2) a method, which comprises applying the above described coating liquid onto a substrate acting as a gas diffusion layer, such as a carbon paper, a carbon cloth or a carbon felt, then drying it to form a catalyst layer, and then combining the catalyst layer with a solid polymer electrolyte membrane according to a method such as hot pressing; and (3) a method, which comprises applying the above described coating liquid onto a film (substrate) exhibiting sufficient stability to a solvent contained in the coating liquid, drying it, then hot-pressing it to obtain a solid polymer electrolyte membrane, then removing the substrate film, and then sandwiching the resultant with gas diffusion layers.

The application method is not particularly limited. Examples of the application method include: batch-type methods such as a bar coater method, spin coater method and a screen printing method; and continuous methods such as a post-measurement method and a pre-measurement method. The post-measurement method is a method, which comprises applying an excessive amount of coating liquid and then removing a redundant coating liquid so as to achieve a predetermined membrane thickness. The pre-measurement method is a method, which comprises applying a necessary amount of coating liquid to achieve a predetermined membrane thickness. Examples of such post-measurement method include an air doctor coater method, a blade coater method, a rod coater method, a knife coater method, a squeeze coater method, an impregnation coater method, and a comma coater method. Examples of such pre-measurement method include a die coater method, a reverse roll coater method, a transfer roll coater method, a gravure coater method, a kiss roll coater method, a cast coater method, a spray coater method, a curtain coater method, a calendar coater method, and an extrusion coater method. In order to form a homogeneous catalyst layer, a screen printing method and a die coater method are preferable. If taking into consideration production efficiency, a continuous die coater method is more preferable.

Catalysts contained in the catalyst layer of the present embodiment may be either identical or different between the anode and cathode sides. A metal catalyst containing platinum or platinum alloy, which is supported on a carbon, is preferable. In order that the metal catalyst is supported on a carbon serving as a carrier with high dispersibility, and that it has stable electrode reactivity over a long period of time, such carbon carrier preferably has a specific surface area of 50 to 1500 m$^2$/g. In order to be highly active to a hydrogen oxidation reaction on the anode of a polymer electrolyte fuel cell and an oxygen reduction reaction on the cathode thereof, the metal catalyst preferably contains platinum. A metal catalyst containing a platinum catalyst is also preferable because there may be a case in which stability or activity as an electrode catalyst can be further achieved. The above described platinum alloy is preferably an alloy containing platinum and one or more types of metals selected from the group consisting of platinum metals other than platinum (ruthenium, rhodium, palladium, osmium, and iridium), gold, silver, chromium, iron, titanium, manganese, cobalt, nickel, molybdenum, tungsten, aluminum, silicon, zinc, and tin. The platinum alloy may further comprise an intermetallic compound, which is formed from platinum and a metal forming an alloy together with platinum.

When gas containing carbon monoxide is supplied to the anode, the use of an alloy containing platinum and ruthenium is preferable because the activity of a catalyst becomes stable.

In the present embodiment, to a membrane electrode assembly for a fuel cell, gas containing oxygen is supplied to the cathode thereof, and gas containing hydrogen is supplied to the anode thereof. Specifically, for example, a separator on which a ditch serving as a flow channel for such gas is formed is disposed outside of the electrode of the membrane electrode assembly, and the gas is then supplied through the flow channel for gas, so that the gas serving as fuel can be supplied to the membrane electrode assembly, thereby generating power. Moreover, it can be also used as a membrane electrode assembly for a direct methanol fuel cell, to which methanol is supplied as fuel gas.

The fuel cell of the present embodiment is a fuel cell comprising an electrode assembly, and it comprises any of the above described electrolyte membrane and/or the above described catalyst layer serving as gas diffusion electrode. In addition, it is preferably a fuel cell comprising an electrode assembly that is produced from the above described electrolyte membrane and the above described catalyst layer.

The fuel cell of the present embodiment comprises the electrolyte membrane and/or gas diffusion electrode that are produced using the above described dispersion composition. As a result, the present fuel cell has a high electromotive force.

In the present embodiment, the fuel cell has an electromotive force of 0.35 V in a test for single cell characteristics (current density: 1 A/cm$^2$). It has an electromotive force of preferably 0.40 V, and more preferably 0.45 V.

EXAMPLES

Hereinafter, the present embodiment will be specifically described more in detail in the following Examples and Comparative Examples. However, these examples are not intended to limit the present embodiment. It is to be noted that evaluation methods and measurement methods used in the present embodiment are as follows.

(1) Equivalent Weight of Fluorine-Containing Ion Exchange Resin

Approximately 0.02 to 0.10 g of an acid-type fluorine-containing ion exchange resin was immersed in 50 mL of a saturated NaCl aqueous solution (0.26 g/mL) at 25° C., and it was then left for 10 minutes, while stirring. Thereafter, phenolphthalein (a special grade chemical, manufactured by Wako Pure Chemical Industries, Ltd.) was used as an indicator, and neutralizing titration was performed with a 0.01 N sodium hydroxide aqueous solution (a special grade chemical, manufactured by Wako Pure Chemical Industries, Ltd.). After completion of the neutralization, the obtained Na-type ion exchange membrane was rinsed with pure water and was then subjected to vacuum drying, followed by weighing. The equivalent amount of sodium hydroxide required for the neutralization was indicated with M (mmol), and the mass of the Na-type ion exchange membrane was indicated with W (mg). The equivalent weight (g/eq) was obtained using the following formula:

$$\text{The equivalent weight} = (W/M) - 22$$

(2) Melt Flow Rate (MFR) of Fluorine-Containing Ion Exchange Resin Precursor

According to JIS K-7210, the melt flow rate (MFR, g/10 minutes) of the fluorine-containing ion exchange resin precursor was measured at a temperature of 270° C. at a load of 2.16 kg, using a device having an orifice with an inner diameter of 2.09 mm and a length of 8 mm.

(3) Concentration of Fluorine-Containing Ion Exchange Resin in Dispersion Composition The mass of a dry weighing bottle was exactly weighed at room temperature, and it was defined as W0. Thereafter, 10 g of a product to be measured was placed in the measured weighing bottle. The weight was exactly weighed, and it was defined as W1. Using an LV-120 vacuum drier manufactured by ESPEC Corporation, the weighing bottle containing the product to be measured was dried at a temperature of 110° C. at an absolute pressure of 0.01 MPa or less for 3 hours or more. Thereafter, the resultant was cooled in a desiccator containing silica gel. After the temperature of the resultant had been decreased to room temperature, the resultant was exactly weighed. The obtained value was defined as W2.

The value obtained from the formula (W2−W0)/(W1−W0) was expressed with percentage. The measurement was carried out 5 times, and the mean value was defined as the concentration of the fluorine-containing ion exchange resin.

(4) Viscosity of Dispersion Composition

Using a TV-33 corn plate type viscometer (type E viscometer) and a 1° 34'×R24 standard corn rotor (rotor code 01), manufactured by Toki Sangyo Co., Ltd., the dispersion composition was measured at a temperature of 25° C. at a shearing rate of 76.6 $sec^{-1}$, and the value obtained after a lapse of 2 minutes of measurement time was defined as the viscosity of the dispersion composition.

(5) Concentration of Alcohol in Dispersion Composition

A gas chromatograph G4000 manufactured by Shimadzu Corporation and a capillary column InertCap WAX (inner diameter: 0.25 mm, length: 30 m, film thickness: 0.25 μm) manufactured by GL Sciences Inc. were used. Using 1-butanol (a special grade chemical, manufactured by Wako Pure Chemical Industries, Ltd.) as an internal standard substance, a calibration curve had previously been prepared with the alcohol. Thereafter, 1 g of the dispersion composition, 1 g of a 1-mass-% 1-butanol aqueous solution, and 18 g of purified water were mixed, and the obtained mixture was used as a measurement sample. An injection port was set at 200° C., a hydrogen flame ionization detector was set at 210° C., and an oven was set at 60° C. Thereafter, using a microsyringe, 1 μL of the measurement sample was poured. Immediately thereafter, the temperature of the oven was increased at a rate of 10° C./minute, and a peak area was then obtained from the spectrum measured at that time, so as to measure the concentration of the alcohol.

(6) Particle Size Distribution of Dispersion Composition

Using a zeta potential and particle size measurement system ELS-Z2 Plus manufactured by Otsuka Electronics Co., Ltd. as a dynamic light scattering photometer, the time correlation function of scattering light was measured with a disposable cell at a temperature of 25° C. under conditions of: pinhole: 50 μm, use of a LOG correlator, automatic light control function: yes, dust cutting: no, and cumulated number: 500. The obtained time correlation function was defined as $G1(t)$, and the particle size distribution of the dispersion composition was obtained.

(7) Evaluation of Fuel Cell

Evaluation of the actuation of a polymer electrolyte fuel cell, which comprised an electrolyte membrane produced using a dispersion composition of fluorine-containing ion exchange resin as a raw material, was carried out by sandwiching the electrolyte membrane between two gas diffusion electrodes and then hot-pressing it at 160° C. at a pressure of 50 kg/$cm^2$ to produce MEA.

As such gas diffusion electrode, there was used a gas diffusion electrode, ELAT (registered trademark) (supported Pt amount: 0.4 mg/$cm^2$), manufactured by DE NORA NORTH AMERICA, U.S.A. The electrode catalyst layer was formed using a product produced by applying a dispersion composition of fluorine-containing ion exchange resin onto the surface of a gas diffusion electrode and then drying/consolidating it at 140° C. in an atmospheric air (supported polymer amount: 0.8 mg/$cm^2$).

This MEA was inserted into a flange made of graphite having a gas flow channel on the surface thereof, it was then incorporated into an evaluation cell enclosed with a fuel cell frame made of metal, and it was then equipped in an evaluation device. Specifically, using hydrogen gas as fuel and also using air gas as an oxidizer, the above described MEA was subjected to a test for single cell characteristics (voltage: 0.65 V; current density: 0.5 A/$cm^2$) at ordinary pressure at a cell temperature of 95° C. A water bubbling system was employed for moisturizing the gas. Thus, both the hydrogen gas and the air gas were moisturized at 50° C., and were then supplied to the cell.

Example 1

Using an extruder, a fluorine-containing ion exchange resin precursor containing a copolymer (MFR=3.0) of an olefin fluoride ($CF_2=CF_2$) which is represented by formula (3) wherein Z=F, and a vinyl fluoride compound ($CF_2=CF-O-(CF_2)_2-SO_2F$) reperesented by the above formula (4) wherein m=2, n=0, and W=$SO_2F$, was extruded through a round-shaped base at 270° C., and was then cut, so as to produce a columnar pellet having a diameter of 2 to 3 mm and a length of 4 to 5 mm. Thereafter, 510 g of this fluorine-containing ion exchange resin precursor pellet was immersed for 6 hours in 2460 g of a KOH aqueous solution, which had previously been prepared by adding KOH and DMSO to water, resulting in a KOH concentration of 15-mass-% and a DMSO concentration of 30-mass-%, so that the $SO_2F$ group in the fluorine-containing ion exchange resin precursor was converted to an $SO_3K$ group.

The above treated pellet was immersed in 2500 mL of 1 N HCl at 60° C. for 6 hours. Thereafter, the resultant was washed with ion exchange water (conductivity: 0.06 S/cm or less) at 60° C., and was then dried, so as to obtain a fluorine-containing ion exchange resin (equivalent weight=720 g/eq) having a proton exchange group, in which the aforementioned $SO_2K$ group was converted to an $SO_2H$ group.

Subsequently, 120 g of the above described fluorine-containing ion exchange resin (water content percentage: 28.7% by mass), 485 g of ethanol, and 949 g of ion exchange water were added to an inner glass cylinder of a 5-L autoclave made of SUS304 having such inner glass cylinder. Moreover, 70 g of ethanol and 140 g of ion exchange water were added between the inner cylinder and the inner wall of the autoclave. While stirring liquid contained in the inner glass cylinder, a dispersion treatment was carried out at 162° C. for 4 hours. The pressure in the autoclave was increased by heating, and the highest pressure was found to be 1.2 MPa. After cooling, the resultant was taken out from the autoclave, and as a result, a homogeneous, transparent, dispersion composition of fluorine-containing ion exchange resin AS0 was obtained. The composition of such AS0 was 5.0% by mass of the fluorine-containing ion exchange resin, 30.0% by mass of ethanol, and 65.0% by mass of water.

Thereafter, 350 g of the above described dispersion composition was added to a 500-mL eggplant flask. While rotating the flask at 80° C. at 40 rpm with a rotary evaporator R-200 manufactured by BUCHI, it was subjected to azeotropic distillation at a decompression degree of 0.04 MPa to concentrate the fluorine-containing ion exchange resin to a concentration of 15% by mass, thereby obtaining a dispersion composition AS1. The composition of such AS1 was 15.0% by mass of the fluorine-containing ion exchange resin, 0.4% by mass of ethanol, and 84.6% by mass of water. The ratio of large particles having a particle size of 10 μm or more was 42% by volume.

Example 2

A dispersion composition AS2 was obtained in the same manner as in Example 1 with the exception that concentration was carried out to a fluorine-containing ion exchange resin concentration of 20% by mass. The composition of such AS2 was 20.0% by mass of the fluorine-containing ion exchange resin, 0.0% by mass of ethanol, and 80.0% by mass of water. The ratio of large particles having a particle size of 10 μm or more was 42% by volume.

Example 3

A dispersion composition AS3 was obtained in the same manner as in Example 1 with the exception that concentration was carried out to a fluorine-containing ion exchange resin concentration of 25% by mass. The composition of such AS3 was 25.0% by mass of the fluorine-containing ion exchange resin, 0.0% by mass of ethanol, and 75.0% by mass of water. The ratio of large particles having a particle size of 10 μm or more was 42% by volume.

Example 4

A dispersion composition AS4 was obtained in the same manner as in Example 1 with the exception that concentration was carried out to a fluorine-containing ion exchange resin concentration of 30% by mass. The composition of such AS4 was 30.0% by mass of the fluorine-containing ion exchange resin, 0.0% by mass of ethanol, and 70.0% by mass of water. The ratio of large particles having a particle size of 10 μm or more was 42% by volume.

Using a die coater, the obtained dispersion composition was applied onto a polyethylene terephthalate (PET) film whose surface had been treated with a silicon mold releasing agent, resulting in a thickness of 30 μm after drying. Thereafter, it was dried at 80° C. to form an electrolyte membrane. During this operation, the drying time necessary for the formation of the electrolyte membrane was 8 minutes.

Subsequently, using the thus obtained electrolyte membrane and the dispersion composition AS1 obtained in Example 1 as materials for forming an electrode catalyst layer, MEA was formed by the method described above in "(7) Evaluation of fuel cell", and it was then subjected to a test for fuel cell characteristics. As a result, an extremely high electromotive force (0.46 V) was obtained at a current density of 1 A/cm$^2$.

Example 5

1600 g of AS1 was added as a raw material into the inner glass cylinder, and 225 g of ion exchange water was added between the inner cylinder and the inner wall of an autoclave. While stirring liquid contained in the inner glass cylinder, it was treated at 152° C. for 4 hours, so as to obtain a homogeneous dispersion composition of fluorine-containing ion exchange resin.

Thereafter, 350 g of the above described composition was added to a 500-mL eggplant flask. While rotating the flask at 80° C. at 40 rpm with a rotary evaporator R-200 manufactured by BUCHI, it was distilled at a decompression degree of 0.08 MPa to concentrate the fluorine-containing ion exchange resin to a concentration of 30% by mass, thereby obtaining a dispersion composition AS5. The composition of such AS5 was 30.0% by mass of the fluorine-containing ion exchange resin, 0.0% by mass of ethanol, and 70.0% by mass of water. The ratio of large particles having a particle size of 10 μm or more was 15% by volume.

Example 6

A dispersion composition AS6 was obtained in the same manner as in Example 5 with the exception that concentration was carried out to a fluorine-containing ion exchange resin concentration of 40% by mass. The composition of such AS6 was 40.0% by mass of the fluorine-containing ion exchange resin, 0.0% by mass of ethanol, and 60.0% by mass of water. The ratio of large particles having a particle size of 10 μm or more was 15% by volume.

Using a die coater, the obtained dispersion composition was applied onto a polyethylene terephthalate (PET) film whose surface had been treated with a silicon mold releasing agent, resulting in a thickness of 30 μm after drying. Thereafter, it was dried at 80° C. to form an electrolyte membrane. During this operation, the drying time necessary for the formation of the electrolyte membrane was 5 minutes.

Subsequently, using the thus obtained electrolyte membrane and the dispersion composition AS5 obtained in Example 5 as materials for forming an electrode catalyst layer, MEA was formed by the method described in (7) above, and it was then subjected to a test for fuel cell characteristics. A constant value was obtained from immediately after the beginning of the test, thus the fuel cell was stable. The fuel cell favorably worked over 300 hours or more. In addition, an extremely high electromotive force (0.47 V) was obtained at a current density of 1 A/cm$^2$.

Example 7

A dispersion composition was obtained in the same manner as in Example 1 with the exception that 235 g of the fluorine-containing ion exchange resin (water content percentage: 28.7% by mass) used in Example 1, 497 g of ethanol, and 941 g of ion exchange water were added into the inner glass cylinder to carry out a dispersion treatment. Thereafter, 200 g of the above obtained dispersion composition and 200 g of ion exchange water were added to a 500-mL eggplant flask. While rotating the flask at 80° C. at 40 rpm with a rotary evaporator R-200 manufactured by BUCHI, it was subjected to azeotropic distillation at a decompression degree of 0.04 MPa to concentrate the fluorine-containing ion exchange resin to a concentration of 20% by mass, thereby obtaining a dispersion composition AS7. The composition of such AS7 was 20.0% by mass of the fluorine-containing ion exchange resin, 0.0% by mass of ethanol, and 80.0% by mass of water. The ratio of large particles having a particle size of 10 μm or more was 42% by volume.

Example 8

A dispersion composition AS8 was obtained in the same manner as in Example 7 with the exception that concentration was carried out to a fluorine-containing ion exchange resin concentration of 30% by mass. The composition of such AS8 was 30.0% by mass of the fluorine-containing ion exchange resin, 0.0% by mass of ethanol, and 70.0% by mass of water. The ratio of large particles having a particle size of 10 μm or more was 42% by volume.

Example 9

A dispersion composition AS9 was obtained in the same manner as in Example 1 with the exception that a copolymer (MFR=3.0; equivalent weight: 880 g/eq) of an olefin fluoride ($CF_2$=$CF_2$) represented by the above formula (3) wherein Z=F, and a vinyl fluoride compound ($CF_2$=CF—O—($CF_2CF(CF_2)O$)—$(CF_2)_2$—$SO_2F$) represented by the above formula (4) wherein m=2, n=1, and W=$SO_2F$, was used as a fluorine-containing ion exchange resin (water content percentage: 25.6% by mass). The composition of such AS9 was 15.0% by mass of the fluorine-containing ion exchange resin, 0.4% by mass of ethanol, and 84.6% by mass of water. The ratio of large particles having a particle size of 10 μm or more was 48% by volume.

Comparative Example 1

A dispersion composition AS10 was obtained in the same manner as in Example 1 with the exceptions that 140 g of the fluorine-containing ion exchange resin (water content percentage: 28.7% by mass) used in Example 1, 949 g of ethanol, and 908 g of water were added into the inner glass cylinder to carry out a dispersion treatment, and that concentration was carried out to a fluorine-containing ion exchange resin concentration of 10% by mass. The composition of such AS10 was 10.0% by mass of the fluorine-containing ion exchange resin, 22.9% by mass of ethanol, and 67.1% by mass of water. The ratio of large particles having a particle size of 10 μm or more was 83% by volume.

Comparative Example 2

A dispersion composition AS11 was obtained in the same manner as in Comparative Example 1 with the exception that concentration was carried out to a fluorine-containing ion exchange resin concentration of 20% by mass. The composition of such AS11 was 19.9% by mass of the fluorine-containing ion exchange resin, 1.3% by mass of ethanol, and 78.8% by mass of water. The ratio of large particles having a particle size of 10 μm or more was 83% by volume.

Using a die coater, the obtained dispersion composition was applied onto a polyethylene terephthalate (PET) film whose surface had been treated with a silicon mold releasing agent, resulting in a thickness of 30 μm after drying. Thereafter, it was dried at 80° C. to form an electrolyte membrane. During this operation, the drying time necessary for the formation of the electrolyte membrane was 15 minutes.

Subsequently, using the thus obtained electrolyte membrane and the dispersion composition AS9 obtained in Comparative Example 1 as materials for forming an electrode catalyst layer, MEA was formed by the method described in (7) above, and it was then subjected to a test for fuel cell characteristics. As a result, only a low electromotive force (0.33 V) was obtained at a current density of 1 A/cm².

Comparative Example 3

140 g of the fluorine-containing ion exchange resin (water content percentage: 28.7% by mass) used in Example 1, 450 g of ethanol, and 408 g of water were used to perform a dispersion treatment. The ratio of large particles having a particle size of 10 μm or more was 97% by volume.

The obtained dispersion liquid AS12 contained a large amount of gelatinous product, and thus it was heterogeneous. As a result, a homogeneous electrolyte membrane that could be subjected to a test for fuel cell characteristics could not be produced.

Comparative Example 4

4.2 g of the fluorine-containing ion exchange resin (water content percentage: 28.7% by mass) used in Example 1 and 55.8 g of water were added to an inner glass cylinder of a 0.12-L autoclave made of SUS304 having such inner glass cylinder. Moreover, 10 g of water was added between the inner cylinder and the inner wall of the autoclave. While stirring liquid contained in the inner glass cylinder, a dispersion treatment was carried out at 230° C. for 7 hours. The pressure in the autoclave was increased by heating, and the highest pressure was found to be 2.7 MPa. After cooling, the resultant was taken out from the autoclave. The obtained dispersion composition AS13 was a liquid containing a swollen gelatinous product. The obtained dispersion composition was filtrated using a stainless steel line holder KS-47 manufactured by Advantec Toyo Kaisha, Ltd. and a polypropylene prefilter AN25 (pore size: 2.5 μm; filter size: 47 mmφ) manufactured by Millipore Corporation, so as to obtain a dispersion composition AS13F, which is a residue after removal of the gelatinous product. The composition of AS13F was 1.2% by mass of the fluorine-containing ion exchange resin and 98.8% by mass of water. Moreover, the ratio of large particles having a particle size of 10 μm or more was 0.0% by volume.

Using a die coater, the obtained dispersion composition AS13F was applied onto a polyethylene terephthalate (PET) film, resulting in a thickness of 30 μm after drying. Thereafter, it was dried at 80° C., so as to try to form an electrolyte membrane. However, as the drying operation progressed, cracks were generated on the electrolyte membrane. Fifteen minutes after completion of the drying operation, such cracks were increased to form a small section having a size of several millimeters. As a result, a homogeneous electrolyte membrane that could be subjected to a test for fuel cell characteristics could not be produced.

The viscosity of each of the dispersion compositions of fluorine-containing ion exchange resins obtained in Examples 1-9 and Comparative Examples 1-4 is shown in Table 1. In addition, the size of a particle in such dispersion composition measured with a dynamic light scattering photometer and the abundance ratio thereof are shown in Table 2. In Table 2, the term "small particle" indicates a particle having a particle size of 0.5 μm or less, the term "medium particle" indicates a particle having a particle size from 0.5 μm to 10 μm, and the term "large particle" indicates a particle having a particle size of 10 μm or more.

TABLE 1

| | Sample name | Viscosity (mPa · s) | exp (0.26 × Cd) |
|---|---|---|---|
| Example 1 | AS1 | 9.0 | 49 |
| Example 2 | AS2 | 22.9 | 181 |
| Example 3 | AS3 | 101.1 | 665 |
| Example 4 | AS4 | 897 | 2440 |
| Example 5 | AS5 | 44.3 | 2440 |
| Example 6 | AS6 | 1090 | 32860 |

TABLE 1-continued

| | Sample name | Viscosity (mPa·s) | exp (0.26 × Cd) |
|---|---|---|---|
| Example 7 | AS7 | 23.9 | 181 |
| Example 8 | AS8 | 752 | 2440 |
| Example 9 | AS9 | 19.0 | 49 |
| Comparative Example 1 | AS10 | 88.9 | 14 |
| Comparative Example 2 | AS11 | 1100 | 176 |
| Comparative Example 3 | AS12 | 460 | 13 |
| Comparative Example 4 | AS13F | 2.3 | 1.4 |

TABLE 2

| | Sample name | Ratio of small particles (volume %) | Ratio of medium particles (volume %) | Ratio of large particles (volume %) |
|---|---|---|---|---|
| Example 1 | AS1 | 6 | 52 | 42 |
| Example 2 | AS2 | 3 | 55 | 42 |
| Example 3 | AS3 | 2 | 56 | 42 |
| Example 4 | AS4 | 2 | 56 | 42 |
| Example 5 | AS5 | 23 | 62 | 15 |
| Example 6 | AS6 | 21 | 64 | 15 |
| Example 7 | AS7 | 3 | 55 | 42 |
| Example 8 | AS8 | 2 | 56 | 42 |
| Example 9 | AS9 | 7 | 45 | 48 |
| Comparative Example 1 | AS10 | 7 | 10 | 83 |
| Comparative Example 2 | AS11 | 4 | 13 | 83 |
| Comparative Example 3 | AS12 | 1 | 2 | 97 |
| Comparative Example 4 | AS13F | 24 | 76 | 0 |

From the results shown in Table 1, it was found that the dispersion compositions of fluorine-containing ion exchange resins of Examples 1-9 each had a high concentration of fluorine-containing ion exchange resin (15% by mass or more to 45% by mass or less) and had a low viscosity that was within the range represented by the above formula (I).

On the other hand, the dispersion compositions of fluorine-containing ion exchange resins of Comparative Examples 1-4, which were each produced using a mixed solvent containing 50% by mass or more of alcohol(s), had a viscosity that was not within the range represented by the above formula (I). In particular, in Comparative Example 2, although the fluorine-containing ion exchange resin could be concentrated to a concentration of 20% by mass, a heterogeneous, high-viscosity dispersion composition was produced.

Figure 1:
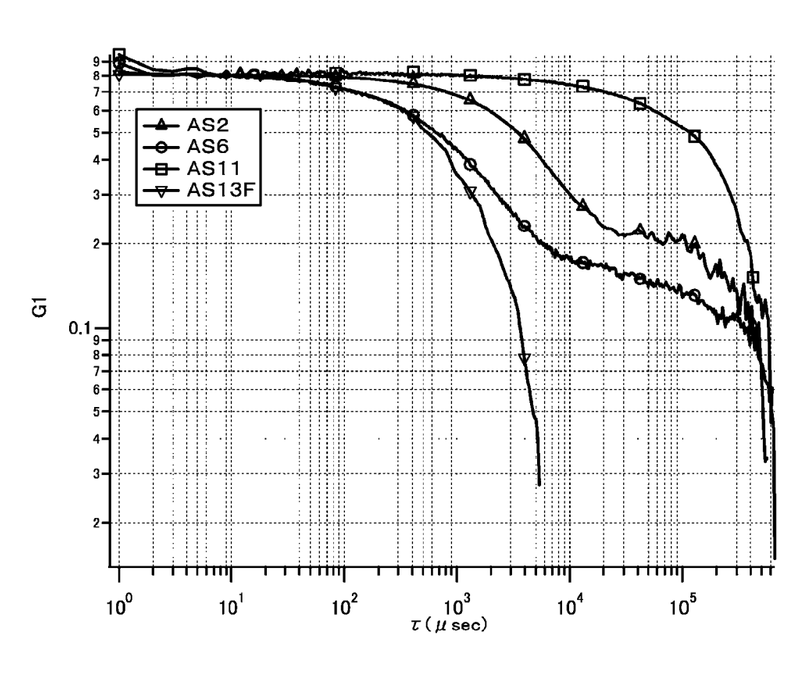
FIG. 1 shows a graph, on which the results obtained by analyzing the dispersion compositions AS2, AS6, AS11, and AS13F described in Examples using a dynamic light scattering photometer are plotted.

FIG. 1 shows a graph, on which the results obtained by analyzing the dispersion compositions AS2, AS6, AS11, and AS13F using a dynamic light scattering photometer are plotted. The horizontal axis indicates the time, the longitudinal axis indicates the time correlation function G1 of scattering light.

FIG. 1 shows that, when compared with the dispersion composition AS11, AS2 and AS6 have a reduced spectrum on the long side of the time axis longer than $1 \times 10^4$ t sec derived from components with a particle size of 10 μm or more. Moreover, FIG. 1 also shows that AS13F has no spectrum on the long side of the time axis longer than $1 \times 10^4$ μsec. Thus, it is revealed that the ratio of particles having a particle size of 10 μm or more was 0% by volume.

The present application claims priority from a Japanese patent application (Japanese Patent Application No. 2008-101764), filed in the Japan Patent Office on Apr. 9, 2008; the disclosure of which is hereby incorporated by reference.

INDUSTRIAL APPLICABILITY

The dispersion composition of fluorine-containing ion exchange resin of the present invention is industrially applicable as a raw material for an electrolyte membrane and an electrode used in a polymer electrolyte fuel cell that can realize high durability.

The invention claimed is:

1. A method of producing a dispersion composition of fluorine-containing ion exchange resin comprising a copolymer represented by the following formula:

wherein
x and y represent numbers satisfying $0 \leq x < 1$, $0 \leq y < 1$, and $x+y=1$;
Z represents H, Cl, F, or a perfluoroalkyl group having 1 to 3 carbon atoms;
m represents an integer of 0 to 12; and
n represents an integer of 0 to 2,
wherein an abundance ratio of a resin having a particle size of 10 μm or more in the fluorine-containing ion exchange resin is 0.1% to 48% by volume; and
a viscosity ηd (mPa·s) of the dispersion composition is within a range of formula (I): $\eta d \leq \exp(0.26 \times Cd)$ wherein Cd represents a concentration, mass %, of the fluorine-containing ion exchange resin,
the method comprising:
mixing 1% by mass or more and less than 15% by mass of the fluorine-containing ion exchange resin having an equivalent weight of from 400 to 1000 g/eq into a mixed solvent containing 50.1% to 99.9% by mass of water and 0.1% to 49.9% by mass of alcohol;
subjecting an aqueous composition comprising the fluorine-containing ion exchange resin to a dispersion treatment; and
concentrating the aqueous composition subjected to the dispersion treatment, so that the concentration Cd (mass %) of the fluorine-containing ion exchange resin becomes 20% by mass or more and 45% by mass or less.

2. The method for producing the dispersion composition according to claim 1, wherein the alcohol is one or more of alcohols selected from the group consisting of methanol, ethanol, 1-propanol, and 2-propanol.

3. The method for producing the dispersion composition according to claim 1, wherein the aqueous composition is subjected to the dispersion treatment at 220° C. or less.

4. The method for producing the dispersion composition according to claim 1, wherein in the formula, n=0 and m=2.

5. The method for producing the dispersion composition according to claim 2, wherein the aqueous composition is subjected to the dispersion treatment at 220° C. or less.

6. The method for producing the dispersion composition according to claim 2, wherein in the formula, n=0 and m=2.

* * * * *